(12) United States Patent
Frem et al.

(10) Patent No.: US 10,226,909 B2
(45) Date of Patent: Mar. 12, 2019

(54) LAMINATED MOISTURE RESISTANT POULTRY BOX AND PROCESS

(71) Applicant: Phoenix Machinery S.A.L., Beirut (LB)

(72) Inventors: Neemat Frem, Beirut (LB); Rabih Osta, Beirut (LB); Elie Njeim, Beirut (LB); Sylvain Seif, Beirut (LB)

(73) Assignee: INDEVCO PLASTICS, INC., Doswell, VA (US)

( * ) Notice: Subject to any disclaimer, the term of this patent is extended or adjusted under 35 U.S.C. 154(b) by 0 days.

(21) Appl. No.: 15/186,857

(22) Filed: Jun. 20, 2016

(65) Prior Publication Data

US 2017/0361991 A1 Dec. 21, 2017

(51) Int. Cl.

| | | |
|---|---|---|
| B65D 25/34 | (2006.01) |
| B32B 27/36 | (2006.01) |
| B32B 3/28 | (2006.01) |
| B65D 5/02 | (2006.01) |
| B65D 5/42 | (2006.01) |
| B32B 27/10 | (2006.01) |
| B32B 37/12 | (2006.01) |
| B31F 1/28 | (2006.01) |
| B65D 65/40 | (2006.01) |
| B65D 65/42 | (2006.01) |
| B65D 65/46 | (2006.01) |
| B65D 5/56 | (2006.01) |

(52) U.S. Cl.
CPC ............. *B32B 3/28* (2013.01); *B31F 1/2813* (2013.01); *B32B 27/10* (2013.01); *B32B 27/36* (2013.01); *B65D 5/563* (2013.01); *B65D 65/403* (2013.01); *B65D 65/42* (2013.01); *B65D 65/466* (2013.01); *B32B 2317/127* (2013.01); *B32B 2367/00* (2013.01); *B32B 2439/62* (2013.01); *B32B 2439/70* (2013.01); *Y02W 30/805* (2015.05); *Y02W 90/11* (2015.05)

(58) Field of Classification Search
CPC ........ B65D 25/34; B65D 5/02; B65D 5/4266; B65D 5/563; B32B 27/10; B32B 27/36; B32B 37/1284; B32B 3/28; B32B 2307/7265; B32B 2367/00; B32B 2439/62; B32B 2439/70; B32B 2317/127
USPC .............. 229/5.81, 103.11, 122.32; 524/313; 156/205, 308.6; 428/34.2, 537.5, 498; 528/74.5; 508/491, 493
See application file for complete search history.

(56) References Cited

U.S. PATENT DOCUMENTS

| | | |
|---|---|---|
| 2,840,138 A | 6/1958 | Johnston et al. |
| 4,752,637 A | 6/1988 | Israel |
| 4,871,406 A | 10/1989 | Griffith |
| 5,575,418 A * | 11/1996 | Wu .................. A23B 7/148 229/5.81 |

(Continued)

*Primary Examiner* — Christopher Demeree
(74) *Attorney, Agent, or Firm* — Gipple & Hale; John S. Hale

(57) ABSTRACT

A moisture resistant poultry box having a composite structure with a fluted paper medium, a top backing board assembly secured to one side of the fluted medium and a bottom backing board assembly secured to the other side of the fluted medium. The backing board assemblies and the fluted medium are impregnated with a hydrogenated triglyceride, and each backing board assembly has PET film glued thereto covering an outside surface to provide moisture resistant recyclable poultry box so that it has a Cobb value ranging between about 0 to about 1.

15 Claims, 8 Drawing Sheets

(56) References Cited

U.S. PATENT DOCUMENTS

| | | | |
|---|---|---|---|
| 5,944,252 A * | 8/1999 | Connelly | B31D 3/005 |
| | | | 229/132 |
| 6,103,308 A | 8/2000 | Floyd et al. | |
| 6,201,053 B1 | 3/2001 | Dickermann et al. | |
| 6,846,573 B2 | 1/2005 | Seydel | |
| 7,195,804 B2 | 3/2007 | Cosentino et al. | |
| 7,870,992 B2 | 1/2011 | Schille et al. | |
| 8,455,061 B2 | 6/2013 | Bugas et al. | |
| 8,802,205 B2 * | 8/2014 | Bugas | B31F 1/2818 |
| | | | 156/278 |

* cited by examiner

LAMINATED MOISTURE RESISTANT POULTRY BOX AND PROCESS

RELATED APPLICATIONS

There are no related applications.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

None.

FIELD OF THE INVENTION

The present invention generally relates to moisture resistant and water proof paper products including linerboard and corrugated board. Particularly, this invention relates to a process and moisture resistant paper boxes made by the process for use primarily in the food industry. The corrugated board used to make the paper boxes is waterproofed by the addition of a layer of plastic film glued to a single faced liner which is impregnated with a hydrogenated triglyceride.

BACKGROUND OF THE INVENTION

Corrugated paperboard is widely used as a material for constructing containers and other packaging applications. Untreated corrugated paperboard is strong, relatively inexpensive and may be recycled by composting or re-pulping. Conventional corrugated paperboard is constructed of two opposing liners and an intervening fluted medium secured between each liner with an adhesive, typically starch. The corrugated paperboard is heated to dry or cure the adhesive during its assembly on the corrugator.

Petroleum derived paraffin waxes and synthetic polymers have been used as coatings for many years in the manufacture of paper and paperboard as moisture retardants, water repellents, oil repellents, stiffeners, strengtheners, and release agents. Besides paraffin waxes, the material used most often in such products is polyethylene. However, other widely used polymers in the field include polymerized acrylics, vinyls, styrenes, ethylenes and copolymers or hetero-polymers of these monomers. The paper and paperboard to which these traditional materials are applied is difficult and often impossible recycle in standard paper mill processes because the petroleum derived polymers and, particularly, the petroleum waxes are non-biodegradable in mill white waters (circulated process waters) and discharge effluents. Furthermore, the residue of the petroleum waxes that is not removed from pulp fibers during the recycling processes causes severe operation and maintenance problems due to buildup that occurs on the screens and felts used during the process of forming and making the paper or paperboard sheet. Likewise, coatings and impregnated products made from or based on paraffin waxes and/or similar petroleum derivatives can only be re-pulped for recycling in specially configured re-pulping equipment that removes and separates the paraffin waxes. In addition, paper and paperboard coated or impregnated with petroleum waxes resist biodegradation and composting when disposed of in landfills and other waste disposal systems. Moreover, boxes containing petroleum waxes must be separated and deposited in separate landfill areas.

Paper and paperboard coated or impregnated with traditional synthetic polymers and hetero-polymers are also difficult to impossible to recycle owing to their resistance to separation from the fiber in the standard re-pulping processes resulting in significant fiber losses during efforts to re-pulp and recycle them. These coated or impregnated paper and corrugated board are also non-biodegradable and therefore resist composting.

As previously noted, water repellent packaging currently being used utilizes petroleum based liquid polymers or polymer film laminates (including polyethylene or similar film laminates such as polyolefin, polyester, polyvinyl alcohol, polyvinyl acetate, polystyrene, polypropylene, and the like) which are recyclable after extensive treatment, All of these laminates require the installation of specialized machinery that is far more expensive in terms of operating costs and/or recycled pulp fiber yields. The action of separating the fiber from the film damages some fibers causing them to be selected out of the recycled pulp while the separated film waste carries other fibers out of the re-pulpate.

The poultry box industry currently uses a wax to coat the boxes (EVA—poly (ethylene vinyl acetate) which takes a significantly long period of time to compost and leaves a chemical residue from those compounds. This process is known in the industry as curtain coating. There appears to be little or no decomposition of higher molecular weight resin and EVA fractions. Wax coated boxes are not considered to be biodegradable and do not meet the ecology friendly standards of many companies and are therefore not used by these companies.

The use of tallow to treat paper is well known in the prior art and a number of patents have attempted to use tallow to address the above noted problems. U.S. Pat. No. 2,840,138 issued Jun. 24, 1958 discloses the use of tallow fatty acids to impregnate and penetrate corrugated paper material to provide a wilt resistant material while U.S. Pat. No. 4,752,637 issued Jun. 21, 1988 is directed to a method of treating fiberboard to have moisture resistance with various mixtures of hydroxyl terminated esters such as tallow.

U.S. Pat. No. 6,103,308 issued Aug. 15, 2000 is directed toward a paper and paperboard coating composition using vegetable oil triglyceride as a paper coating while U.S. Pat. No. 6,201,053 issued Mar. 13, 2001 is directed toward various triglycerides mixed with catalysts for use as a waterproofing agent on paper coating.

U.S. Pat. No. 6,846,573 issued Jan. 25, 2005 discloses the use of hydrogenated triglycerides having a melting point above 50° as a coating material for the surface of paper products to improve wet strength and moisture resistance of the paper while allowing the paper product to being re-pulpable.

U.S. Pat. No. 7,870,992 issued Jan. 18, 2011 discloses a cardboard container having an outer shell which includes a moisture resistant barrier. The container further includes at least one insulating member disposed within the outer shell having a cellulose-based substrate substantially encapsulated in a polymeric film.

The combination of impregnation of the poultry boxes medium and liner boards with hydrogenated triglyceride and covering the outer surface of the liner boards with a dimethyl or ethylene terephthalate (PET) coating is disclosed in U.S. Pat. No. 8,455,068 issued Jun. 4, 2013. While this coating method resulted in corrugated poultry boxes which provided moisture resistance and were recyclable and re-pulpable, the boxes were only able to obtain a 30 minute Cobb value of about 20-30 causing water absorption of the boxes and structural damage to the sides and corners as well as the fold lines when the boxes were stacked for storage and shipping.

U.S. Pat. No. 4,871,406 issued Oct. 3, 1989 discloses the manufacture of a corrugated paperboard having a layer of plastic film heat laminated to the single face liner of a corrugated board. The film is supplied from a film roll and reeved over an unwrinkling device to smooth it before it is placed on the liner face. The film used for the lamination was a thermal plastic high density polyethylene (HDPE) having a heat seal layer of ethylene acrylic acid (EAA) which allowed the film to be adhered to the liner face. The '406 patent also discloses additional films which can be used for lamination such as coextruded polypropylene (PP) film and EAA or a polyester film coated with EAA. Corrugated boxes using the combined film lamination were used to package meat and poultry as well as viscous materials such as soft drinks, syrups and household chemical products.

U.S. Pat. No. 7,195,804 issued Mar. 27, 2007 discloses the manufacture of a paperboard structure adhered to a backing structure. The backing structure includes an orientated polymer film such as biaxial oriented polyethylene terephthalate film and a reinforcing scrim heat bonded together through the use of a thermal bonding layer to form a film composite.

Manufacturers have been trying to replace wax coated boxes for a number of years due to the fact that wax coated boxes do not compost and are extremely difficult to recycle.

As previously noted, the wax coated boxes are produced by a process known as curtain coating in which liquid wax is applied by pouring a curtain of wax over the exterior surface and/or interior surface of the box blank to form a uniform wax coating on the box blank.

The application of laminates to corrugated material has been undertaken for a number of years to try to solve the above noted problems with mixed success but have been unable to match the 30 minute Cobb values of wax-coated boxes which runs between 0 and 5. Furthermore, most of the lamination was done offline rather than inline which is an expensive manufacturing technique as well as incurring significant transportation costs to transport and store the offline laminated board for use on an inline corrugator.

One significant problem with non-wax coated boxes of corrugated paperboard when used for packaging of fresh poultry, seafood, meat and the like is that such boxes have a higher Cobb value over 20, typically between 40 and 80, and become wet from condensation of moisture within the box or leakage that occurs from the food product by fluid discharge from the product or melting of ice packed products. The corrugated box end corners, sides and fold lines become wet, resulting in a deterioration of box strength, box stacking capability and box tear strength leading to box crushing and tearing of the corners and sides of the boxes when the boxes are stacked.

Other problems with corrugated boxes used for fresh product shipping is that moisture from poultry, seafood and meat or other contained food product causes significant box strength weakening and provides box areas for bacterial growth and possible food contamination.

There thus exists a need for a compostable or recyclable moisture resistant corrugated food box which does not use wax or other non-biodegradable coatings. This problem has been substantially unresolved by the paper corrugating industry for the last decade.

SUMMARY OF THE INVENTION

The present invention is directed to a hydrogenated triglyceride impregnated corrugated paperboard box product comprising an inner fluted medium with laminated backer assemblies secured on opposite sides. Each backer assembly has a paper liner board sheet secured to the tips of the flutes with a starch and the outer paper liner board surface covered with a polyethylene terephthalate (PET) film glued to the outer surface of the paper liner board sheet. The PET film is glued to the paper and not heat bonded to the liner board. The inner corrugated paper fluted medium and the paper liner board sheets are impregnated with a hydrogenated triglyceride.

Hydrogenated triglycerides such as tallow can be applied to the corrugated medium and liners in the same manner as the traditional petroleum waxes and synthetic polymers and functions together with the plastic laminate as a moisture retardant, water repellent, oil repellent, stiffener and strengthener. A particular advantage in this construction is that hydrogenated triglycerides are readily biodegradable and are compostable in landfill or other waste disposal systems. The present invention is easier to re-pulp and recycle without detriment to production machinery, processes, or manufactured product quality or performance.

It is an object of this invention to produce a water resistant paper corrugated container which can be recycled without loss of fiber content.

It is another object of the invention to apply the plastic sheets of film to the liner board and secure them both together with glue rather than heat maintaining the integrity of the low temperature plastic film being used for the laminate thus increasing 30 minute Cobb values.

It is another object of the invention to provide a corrugated poultry box which is biodegradable and compostable.

It is yet another object of the invention is to produce a polyethylene terephthalate film laminated corrugated paperboard box having a moisture vapor barrier property equal or superior to wax coated paperboard, curtain coated wax boards and offline film coatings currently in use.

It is still another object of the invention to produce a recyclable water resistant poultry, seafood or meat corrugated box which has superior moisture resistance and transmission rates in a 30 minute Cobb test having Cobb values ranging from about 0 to about 1.

It is another object of the invention to provide a box surface which can be printed on and takes printing inks to provide a sharp image.

It is another object of the invention to provide a hydrogenated triglyceride impregnated fluted medium and laminated liner board corrugated box.

It is yet another object of the invention to manufacture a water resistant, recyclable laminated poultry box on an inline corrugator.

The invention will be better understood and objects other than those set forth above will become apparent when consideration is given to the following detailed description thereof. Such description makes reference to the annexed drawings wherein.

DETAILED DESCRIPTION OF THE INVENTION

The preferred embodiments and best mode of the invention are shown in FIGS. 1 through 8. While the invention is described in connection with certain preferred embodiments, it is not intended that the present invention be so limited. On the contrary, it is intended to cover all alternatives, modifications, and equivalent arrangements as may be included within the spirit and scope of the invention as defined by the appended claims.

I. Definitions

As used herein the following abbreviations and terms are understood to have the meanings as set forth:

The term "Hydrogenated Triglyceride" includes both animal fats and vegetable oils and is derived from one or a mixture of the animal fats and/or vegetable oils. Animal fats include beef tallow, pork lard, poultry grease and fish oils. Vegetable oils include soybean oil, peanut oil, olive oil, palm oil, coconut oil and cottonseed oil.

The term "Paper" includes substrates and surfaces of cellulosic material.

The term "PET" is a film formed from a thermoplastic resin consisting of polymerized units of the monomer dimethyl terephthalate or polyethylene terephthalate, with repeating $C_{10}H_8O_4$ units formed in a laminating sheet.

The term "moisture resistant" means the tendency of a material to repel or not absorb or transmit liquid in normal use. The term includes moisture repellant and other terminology which means substantial water blocking capabilities or properties as opposed to total water blocking capabilities or properties.

It has been found that hydrogenated triglycerides and preferably either tallow or palm oil can be impregnated into the paper components of the corrugated board, namely, the medium and liners with the outer surface of each liner being covered with a polyester PET film which is glued to the respective liner. This combination can be substituted for petroleum based paraffin waxes and wax compounds in the manufacture of recyclable, paper products and in particular, mediums and liner board of corrugated cardboard. All of these application systems involve melted hydrogenated triglycerides held at a temperature ranging from about 125° to about 170° F. The hydrogenated triglycerides are either squeezed, rolled, cascaded, sprayed, or doctored onto the linerboard, paper, carton stock, or corrugated medium surface to impregnate the same.

Poultry boxes are unique paper container products that need to withstand water and poultry fluid.

Figure 8:
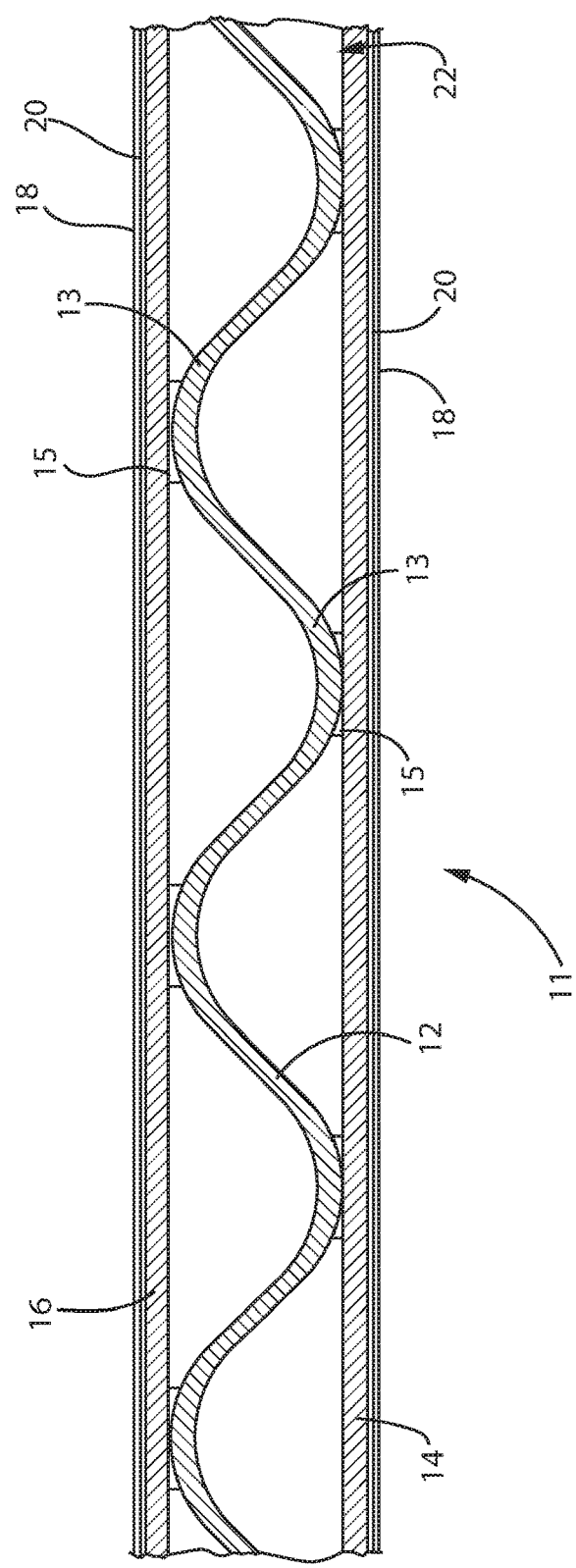
FIG. 8 is an enlarged cross sectional view of the inventive corrugated board taken across the machine direction of the finished laminated corrugated board material.

A preferred embodiment of the inventive moisture resistant poultry box (not shown) according to the invention is constructed from a single corrugated board 11, as shown in cross section in FIG. 8, having a paper fluted medium 12 impregnated with a hydrogenated triglyceride, preferably tallow or palm oil at 3.5 lbs/MSF and the outer paper liner backers 14 and 16 impregnated with the same hydrogenated triglyceride at 2.5 lbs/MSF. Palm oil and tallow used in the impregnation is commercially available from C.J. Robinson Co. and Chemol Corporation.

The corrugated medium 12 is constructed of 30 to 40 lb./1000 sq. ft. (MSF) paperboard in an "A", "B", "C", "E" and "F" flute size (weight depends upon various external factors). The preferred flute size used in the invention is an "A" flute having 33+/−3 flutes per lineal foot with a flute thickness of ⅜ inch or a "C" flute having 39+/−3 flutes per lineal foot with a flute thickness of 5/32 inch.

The outer tip surfaces of the medium flutes 13 are coated with a starch 15 which is applied as is known in the art to hold the laminated liner assemblies 22 in place on the medium 12 once they engage the flute tips. Each laminated liner assembly 22 comprises a paper liner backer 14/16 upon which a plastic film 18, preferably polyethylene terephthalate (PET) having a thickness ranging from about 0.008 mm to about 0.020 mm (8 to 20 microns), most preferably about 0.008 mm to about 0.012 mm (8 to 12 microns) is glued 20 as will be described in more detail to the outer surface of the paper liners 14 and 16 to form laminated liner assemblies 22. The laminated liner assembly 22 is secured by the starch 15 applied to the flute tips of the fluted medium 12 to form the laminated corrugated board 11 used as the box blank. A cross section of the corrugated board 11 is best shown in FIG. 8.

Figure 1:
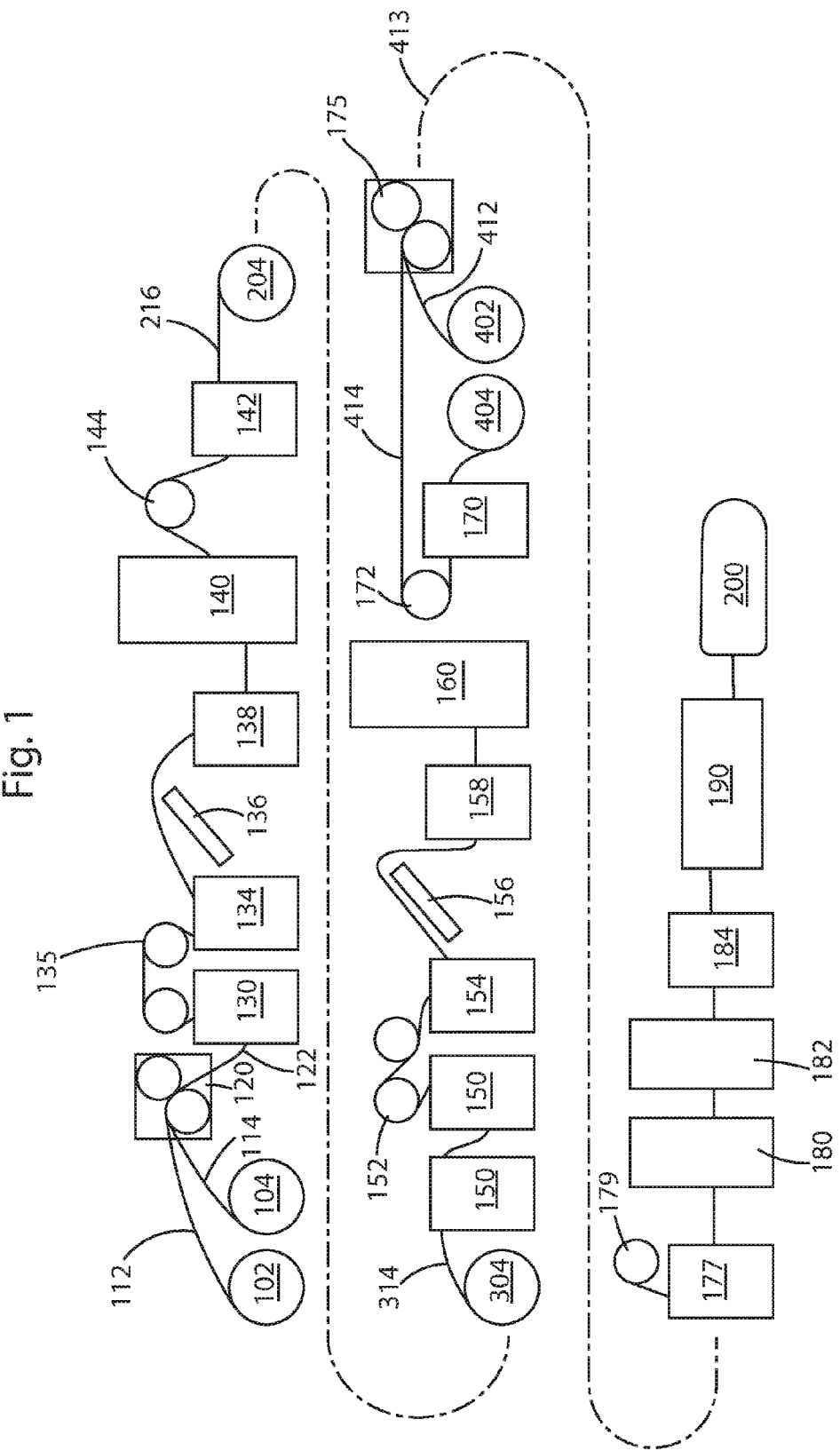
FIG. 1 is a schematic diagram of the inline corrugator used in making the laminated corrugated material of the invention.
Figure 2:
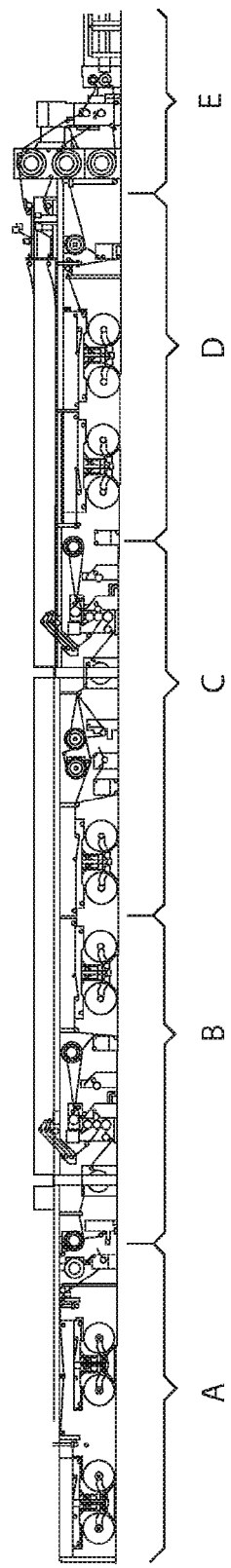
FIG. 2 is a reduced view of the inline corrugation process of the invention.
Figure 3:
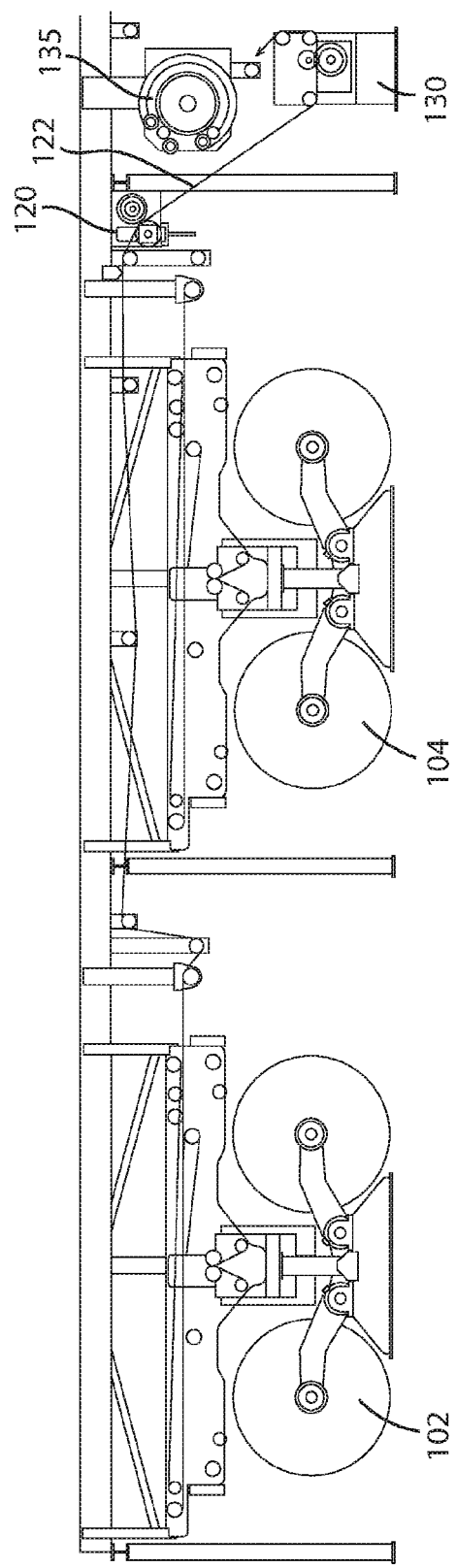
FIG. 3 is an enlarged view of FIG. 2 taken from bracket A of FIG. 2 showing the lamination and impregnation of the of the initial liner assembly in an inline corrugation process.

In operation, the laminated corrugated poultry box is constructed using standard corrugated box making machinery such as an inline corrugator which is schematically shown in FIG. 1. The entire process can be run on an inline corrugator without speed constraints up to 1000 feet per minute. A roll 102 of thermoformed plastic film 112 preferably a smooth sided polyethylene terephthalate is positioned upstream adjacent roll 104 of liner paper 114 and upstream of the glue head assembly 120. Suitable polyester PET film can be acquired from Filmquest Inc. under the trademark QUESTAR® and from Tekra Corporation, a wholly owned subsidiary of Genuine Parts Company. Both the liner paper 114 and the plastic film 112 are individually pulled off the respective rolls 102, 104 by a nip roller and a glue head assembly 120 which applies a thin layer of glue ranging from about 2 GSM to about 10 GSM, preferably about 2 GSM to about 5 GSM in thickness and most preferably about 4 GMS in thickness on the outer surface of the liner paper 114 to hold plastic film 112 secured in place on the liner paper 114. The glue is directly applied as a continuous layer on the liner paper. The preferred glue used to secure the PET film sheet to the paper liners is a cold glue AQUENCE® manufactured by Henkel Corporation which has a solids content of about 55%, a viscosity of 1500 cps and a pH of about 4.5 and is applied at room temperature. Alternatively, a hot melt glue TECHNOMELT® manufactured by Henkel Corporation may be used. This polyamide glue has viscosity of ranging between 3,500 to 4,500 cps and a melt temperature ranging from about 200° C. to about 400° C. The plastic polyethylene terephthalate film 112 travels at the same speed as the liner paper 114 and is aligned with the plastic film 112 and pressed together in roller assembly 120 gluing the liner paper 114 and plastic film 112 together into a unitary composite laminated liner assembly 122. The laminated liner assembly 122 is passed through impregnator 130 which impregnates the paper of the laminated liner assembly and is wound around a heated drum assembly 135 which is heated on its surface to control the temperature of the laminated liner assembly 122. The laminated liner assembly 122 passes through coater 136 and is then passed over infrared dryer 138 over curer drum 139 into the corrugating machine 140.

Figure 4:
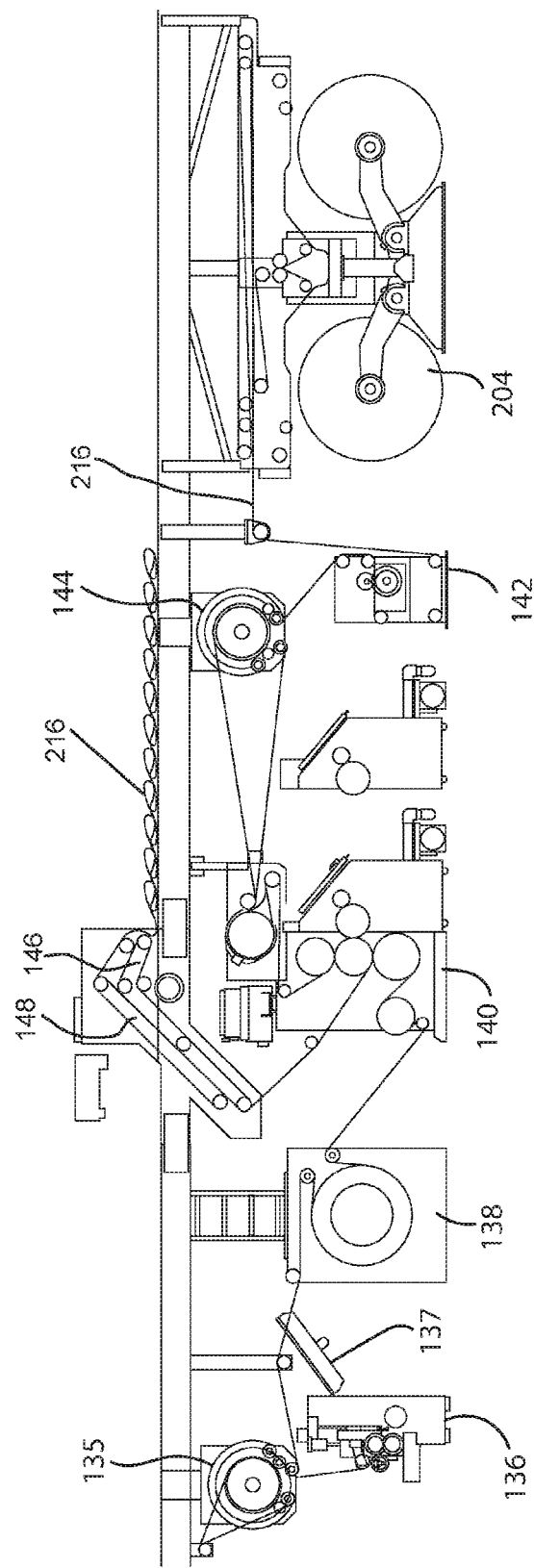
FIG. 4 is an enlarged view of FIG. 2 taken from bracket B of FIG. 2 showing the coater, infrared dryer, formation of the fluted medium, impregnation of the medium and securing the initial laminated liner assembly to the fluted medium in an inline corrugation process.

As shown in FIG. 4, paper medium 216 is pulled from roll 204 located downstream from paper roll 104 through impregnator 142 to impregnate the medium 216 with hydrogenated triglyceride. The paper medium 216 is carried around heated drum assembly 144 into the flute forming corrugating machinery 140 along a top conveyor 148 which deposits the fluted medium 116 on top of the laminated backer sheet 122 carried by bottom conveyor 146 of the corrugating machinery (see FIG. 4). The tips of the flutes of the fluted medium 216 engage the paper 114 of liner assembly 122 carried by lower conveyor 146 of the laminated backer sheet.

The laminated liner assembly 122 is preferably constructed of Kraft paper 114 (various grades) with the laminated plastic PET film 112 glued thereto. The paper 114 is adhered to one side of the fluted medium 216 with a starch based adhesive to form a polyethylene terephthalate (PET) laminated backed corrugated board. The Kraft paperboard liner 114 may be bleached white, coated white (white coat), mottled white or colored. As is well known in the art, the medium paper is humidified by means of high pressure steam which softens the paper fibers to facilitate the formation of the flute and consequent gluing. The paper medium 216 is taken from roll 204 though the corrugator flute forming machine 140 as is well known in the art to make a flute of the desired size such as "A" which is attached as to the laminated backer sheet 122 noted above by starch. After formation of the board, this humidity is removed by drying in the dry-end. In the present invention, the newly formed corrugated liner board is heated by hot plates and the adhesive holding components of the structure is cured.

Figure 5:
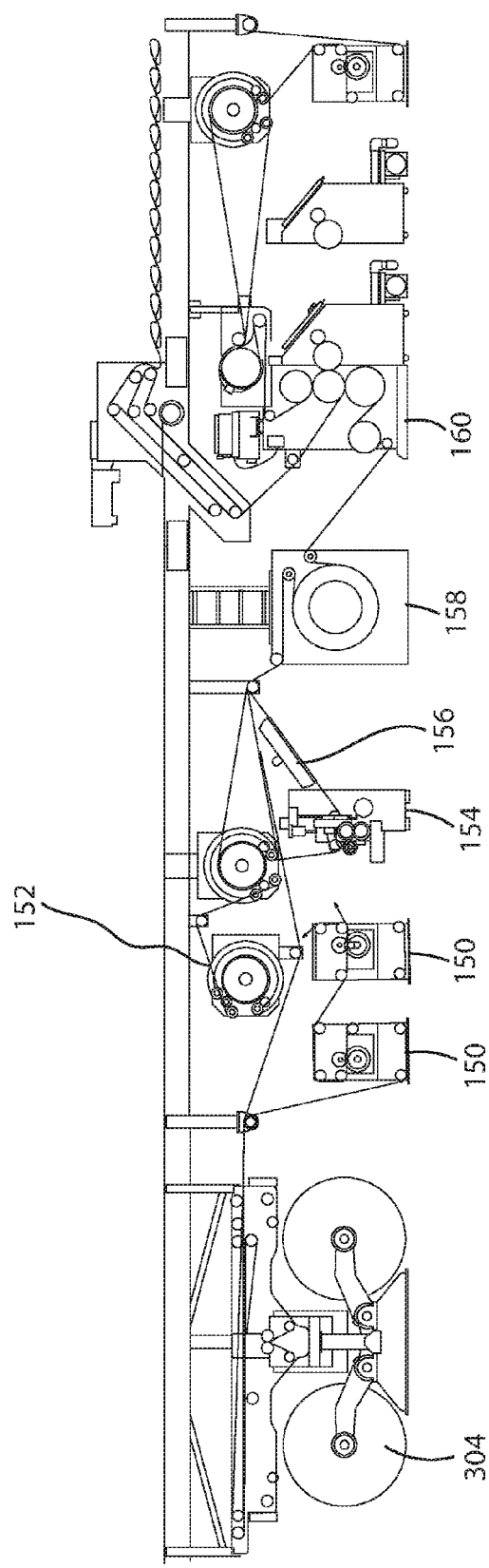
FIG. 5 is an enlarged view of FIG. 2 taken from bracket C of FIG. 2 showing the formation of the alternate sized fluted medium, impregnation of the liner and securing the initial laminated liner backer to the fluted medium in an inline corrugation process.

A second roll of paper 304, as shown in FIG. 5, dispenses paper 314 for forming a second fluted medium 316 preferably of a different flute size from medium 216 (as for example, flute size allowing the medium flute size to be changed on the inline corrugator to "C" from "A"). The fluted paper medium 316 is located downstream, but adjacent to roll 204 and can be converted into fluted medium 316 in a second corrugator flute forming machinery 160 as a back up to the first flute forming machinery 140 or as a second corrugated flute used to build a double wall sheet or for a different size flute. Thus, it can be seen that the technology applies to single wall, double wall or even triple wall sheets. The medium 316 passes from roll 304 through an impregnator assembly 150 which impregnates medium with hydrogenated triglyceride with the medium being transported past dryers 152 into coater 154 and past infrared dryer 156 and dryer 158.

Figure 6:
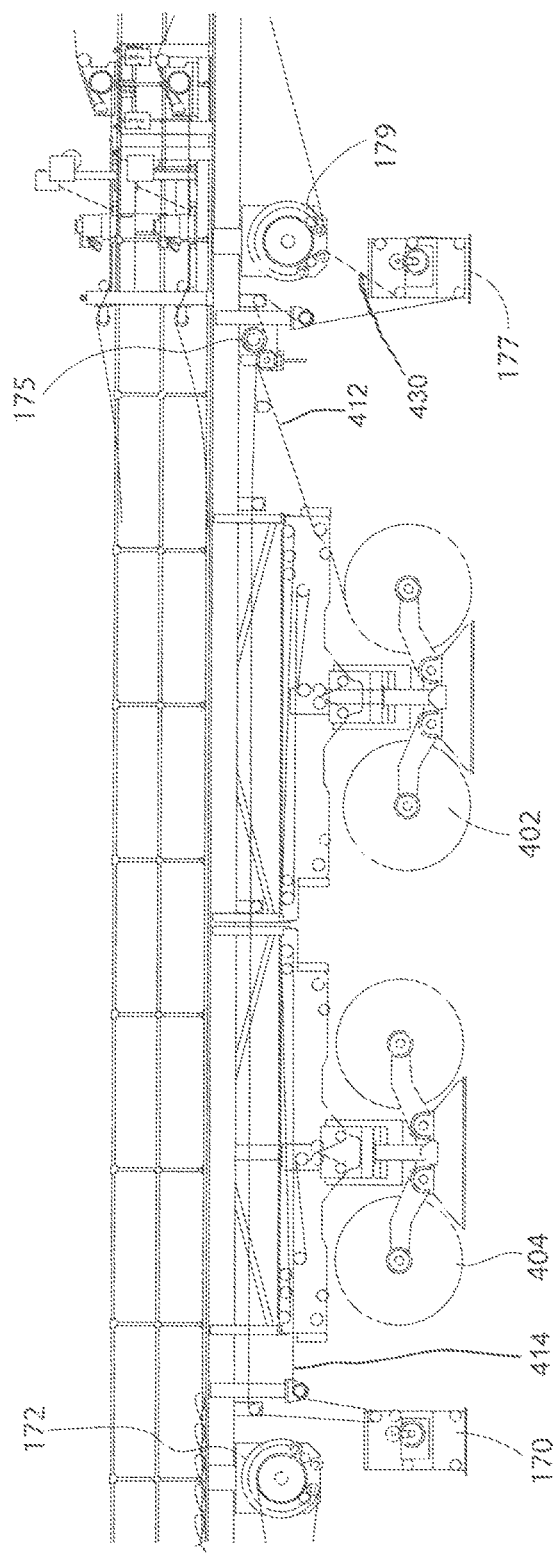
FIG. 6 is an enlarged view of FIG. 2 taken from bracket D of FIG. 2 showing the lamination and impregnation of a second liner assembly in an inline corrugation process.

As shown in FIG. 6, second roll 404 of the liner paper 414 is positioned downstream from the medium flute forming machinery 240 but upstream from film roll 402. The film roll 402 contains thermoformed plastic film 412, preferably polyethylene terephthalate. Both the liner paper 414 and the plastic film 412 are individually pulled off the respective rolls 404, 402 with the liner paper 414 being pulled off the roll through impregnator 170 and dryer 172 by nip rollers around a second glue head 175 which applies a thin layer of glue ranging from about 2 GSM to about 10 GSM, preferably about 4 GSM in thickness on the outer surface of the liner paper 414 to hold the plastic film 412 in place on the liner paper 414. The plastic film 412 travels at the same speed as the liner paper 414 and is aligned with the plastic film 412 and pressed together in glue and nip roller assembly 175 gluing the liner paper 414 and plastic film 412 together into a unitary composite laminated liner assembly 430.

Figure 7:
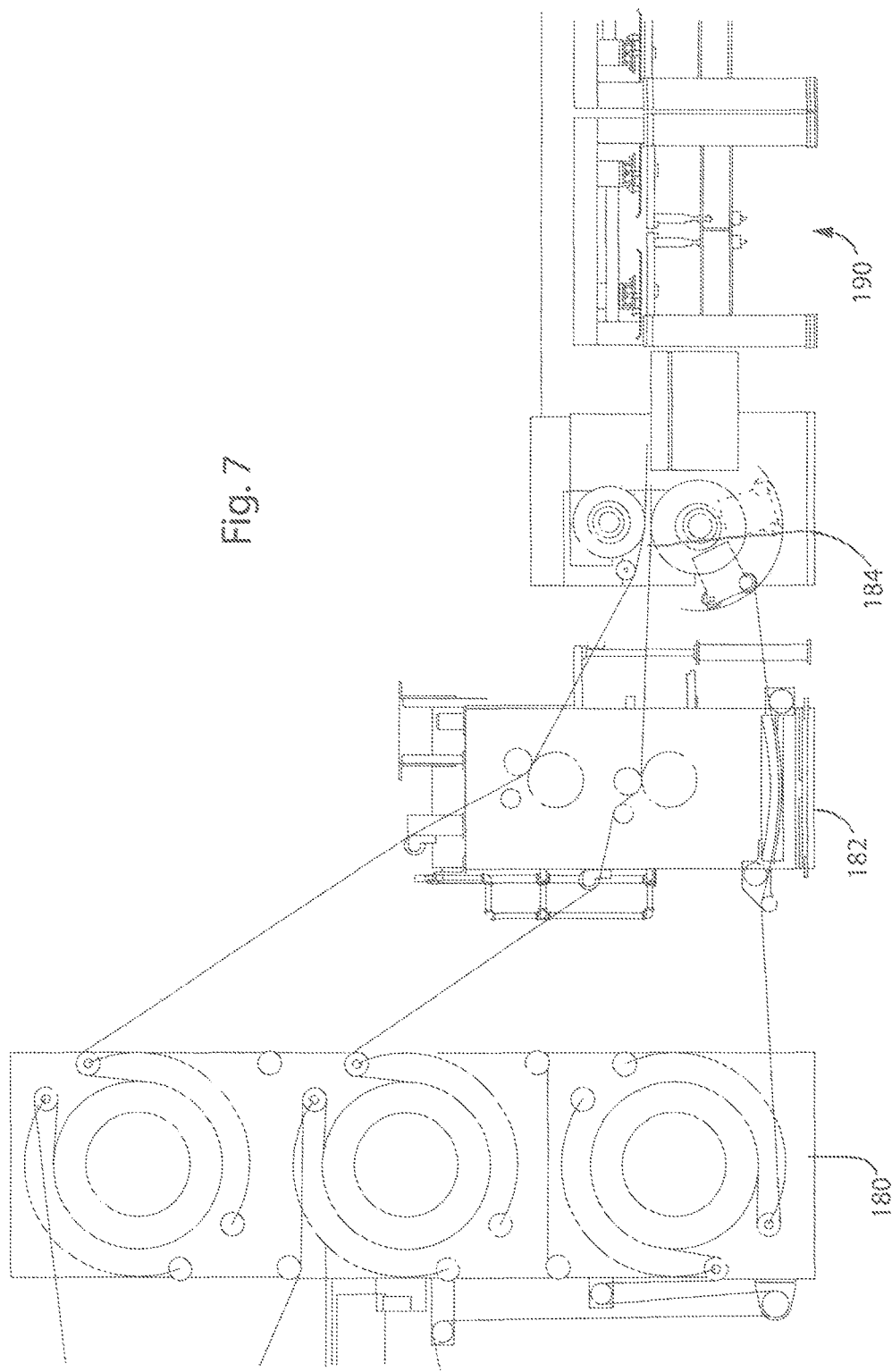
FIG. 7 is an enlarged view of FIG. 2 taken from bracket E of FIG. 2 showing the securing of the second liner assembly to the medium and curing the corrugated board in an inline laminated corrugation process.

The laminated liner assembly 430 is run through an impregnator 177 which impregnates the liner paper 414 of the second laminated liner assembly 430 with hydrogenated triglyceride. The impregnated liner assembly 430 is carried past a heater drum 179 and a stacked heater assembly 180 where the adhesive is cured. As seen in FIG. 7, liner assemblies and medium are run through an adhesive machine 182 into the assemblies 184 which apply starch to the tips of the fluted medium. The liner assemblies and medium are pressed together to form assembly 184 which forms the laminated corrugated board. The corrugator board 11 is passed into a hot plate curing section 190 and the cured corrugated board is cut into box blanks.

The PET film is applied to the outside top and bottom surfaces of the respective liner assemblies and are secured to the medium forming a laminated corrugated board. The laminated corrugated composite board 11 as seen in FIG. 8 is then passed over a heat curing bed 190 to cure and set the adhesive or glue and the laminate. The PET film applied to the outer surface of each liner assembly is of the same thickness.

The heat curing bed 190 is a series of hot plates and pressure rollers which applies light pressure and heat to cure the laminate and adhesive. The composite laminated corrugated board is then scored and cut into individual box blanks in a scoring, cutting and stacking station 200 (shown in FIG. 1) and is well known in the art with known means stacking the individual flat sheets of composite corrugated board. The individual composite corrugated blanks are stacked and dried for a day. The blanks are later placed in a standard box cutting station which cuts and scores the blanks so that they can be folded into the desired box.

The poultry box blanks after being scored and cut at cutter 200, as seen in FIG. 1, and are then delivered and assembled at the poultry or food packing plant and assembled to provide a structurally sound moisture proof box. This box is assembled and tested had a 30 minute Cobb value ranging between 0 to about 10, more preferably ranging from about 0 to about 5 and most preferably ranging from between 0 to about 1.

Testing of the poultry boxes when compared with boxes without impregnated liners showed that hydrogenated triglyceride impregnated boxes had a 7% higher ECT Compression strength and retained 66% of their dry strength compression under 5 days simulated ice pack conditions as opposed to 54% of dry strength compression with non-impregnated liners. Box compression tests were at ambient temperature for simulated ice pack conditions (40 lbs. brick with 10 lbs. of ice).

As previously noted the plastic sheet used in the laminated board backer is a polyethylene terephthalate (PET) film consisting of polymerized units of the monomer dimethyl terephthalate or ethylene terephthalate, with repeating $C_{10}H_8O_4$ units is glued to the liners of the corrugated material. PET contains the chemical elements carbon, hydrogen, and oxygen and has a tensile strength ranging from 55-75 MPa. If fully burned, it produces only carbon dioxide ($CO_2$) and water ($H_2O$) and contains no Sulphur. PET is commonly recycled, and has the number "1" as its recycling symbol.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims:

What is claimed is:

1. A recyclable moisture resistant paper product comprising a structure with a fluted medium, a top paper backing liner with a thermoformed sheet of biodegradable polyethylene terephthalate (PET) ranging in thickness from about 8 microns to about 20 microns glued to on an outer surface of said top paper backing liner to provide moisture resistance and wet strength to the top paper backing liner, said paper backing liner being secured to flutes on one side of said fluted medium, a bottom paper backing liner with a thermoformed sheet of biodegradable polyethylene terephthalate (PET) ranging in thickness from about 8 microns to about 20 microns glued to on an outer surface of said bottom paper backing liner to provide moisture resistance and wet strength to the formed liner assembly, said bottom paper backing liner being secured to flutes on the other side of said fluted medium, with at least one of said paper backing liners and said fluted medium being impregnated with a hydrogenated triglyceride or a blend of natural, partially and fully hydrogenated triglycerides, said paper product being recyclable and having a 30 minute Cobb value ranging from about 0 to about 5.

2. The recyclable moisture resistant paper product of claim 1 wherein the hydrogenated triglyceride is an animal fat selected from the group consisting of beef tallow, pork lard, poultry grease, and fish oils.

3. The recyclable moisture resistant paper product of claim 1 wherein said paper product has a Cobb value ranging from about 0 to about 1.

4. The recyclable moisture resistant paper product of claim 1 wherein the hydrogenated triglyceride is a vegetable oil selected from the group consisting of soybean oil, peanut oil, olive oil, palm oil, coconut oil and cottonseed oil.

5. The recyclable moisture resistant paper product of claim 1 wherein said glue holding the backing liner and PET sheet together ranges from about 2 GSM to about 5 GSM.

6. The recyclable moisture resistant paper product of claim 1 wherein at least one of said backing liners has a plurality of sheets.

7. A recyclable moisture resistant corrugated paper box intended for use in packaging poultry comprising a corrugated paper product having a composite structure with a fluted paper medium and laminated liner sheet assemblies secured to each side of said fluted paper medium, each of said laminated liner sheet assemblies being formed of a paper liner sheet and a smooth sided plastic film formed of polyethylene terephthalate (PET) glued to said paper liner sheet with said paper liner sheet of said laminated liner sheet assembly being secured to an opposite side of said fluted paper medium, said glue ranging in thickness from about 2 GSM to about 10 GSM, at least one of said paper liner sheets of said liner sheet assemblies and said fluted medium being impregnated with hydrogenated triglyceride, said corrugated box having an improved moisture resistance with a 30 minute Cobb value ranging from about 0 to about 1.

8. The recyclable moisture resistant corrugated paper box of claim 7 herein said fluted paper medium has a plurality of different sized flutes.

9. The recyclable moisture resistant corrugated paper box of claim 7 wherein said hydrogenated triglyceride is an animal fat selected from the group consisting of beef tallow, pork lard, poultry grease, and fish oils.

10. The recyclable moisture resistant corrugated paper box of claim 7 wherein said hydrogenated triglyceride is beef tallow.

11. The recyclable moisture resistant corrugated paper box of claim 7 wherein said fluted paper medium is a double wall sheet.

12. The recyclable moisture resistant corrugated paper box of claim 7 wherein said hydrogenated triglyceride is a vegetable oil selected from the group consisting of soybean oil, peanut oil, olive oil, palm oil, coconut oil and cottonseed oil.

13. The recyclable moisture resistant corrugated paper box of claim 7 wherein said hydrogenated triglyceride is palm oil.

14. A recyclable moisture resistant corrugated paper box manufactured on an inline corrugator for use in packaging poultry comprising a corrugated paper product having a composite structure with a fluted paper medium and laminated liner sheet assemblies secured to each side of said fluted paper medium, each of said laminated liner sheet assemblies being formed of a paper liner sheet and a thermoformed smooth sided plastic film sheet formed of polyethylene terephthalate (PET) and ranging in thickness from about 8 microns to about 12 microns glued to said paper liner sheet with said paper liner sheet of said laminated liner sheet assembly being secured to an opposite side of said fluted paper medium, said glue holding said liner sheet to said thermoformed smooth sided plastic film sheet having a thickness of about 4 GSM, at least one of said paper liner sheets of said liner sheet assemblies and said fluted medium being impregnated with hydrogenated triglyceride, said corrugated paper box having an improved moisture resistance with a 30 minute Cobb value ranging from about 0 to about 6.

15. The recyclable moisture resistant corrugated paper box of claim 14 wherein said hydrogenated triglyceride is an animal fat selected from the group consisting of beef tallow, pork lard, poultry grease, and fish oils.

* * * * *